United States Patent
Yanagawa et al.

(10) Patent No.: US 9,610,920 B2
(45) Date of Patent: Apr. 4, 2017

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Wataru Yanagawa, Aichi-ken (JP); Kengo Miura, Aichi-ken (JP); Kosuke Miida, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 124 days.

(21) Appl. No.: 14/669,835

(22) Filed: Mar. 26, 2015

(65) Prior Publication Data
US 2015/0274122 A1    Oct. 1, 2015

(30) Foreign Application Priority Data
Apr. 1, 2014  (JP) .................................. 2014-075652

(51) Int. Cl.
*B60R 22/34* (2006.01)
*B60R 22/44* (2006.01)
*B60R 22/46* (2006.01)

(52) U.S. Cl.
CPC .......... *B60R 22/3413* (2013.01); *B60R 22/44* (2013.01); *B60R 22/4633* (2013.01); *B60R 22/4676* (2013.01); *B60R 2022/4642* (2013.01); *B60R 2022/4661* (2013.01)

(58) Field of Classification Search
CPC ..... B60R 22/34; B60R 22/44; B60R 22/4633; B60R 2022/4661
See application file for complete search history.

(56) References Cited

U.S. PATENT DOCUMENTS

| 6,155,512 | A  | * | 12/2000 | Specht ................ | B60R 22/4633 242/374 |
| 7,500,632 | B2 | * | 3/2009  | Ono .................... | B60R 22/4633 242/374 |
| 8,376,406 | B2 | * | 2/2013  | Nagata ................ | B60R 22/4633 242/374 |
| 2002/0005640 | A1 | * | 1/2002 | Nagata ................ | B60R 22/4633 280/806 |

FOREIGN PATENT DOCUMENTS

JP    2003-252172    9/2003

* cited by examiner

*Primary Examiner* — Sang Kim
(74) *Attorney, Agent, or Firm* — Roberts Mlotkowski Safran Cole & Calderon P.C.

(57) ABSTRACT

In a pretensioner mechanism of a webbing take-up device, a sealing member seals a communicating hole of a piston. When a force limiter mechanism is operated and rotating of a spool in a pull-out direction is allowed, the piston is moved to an upper side in a state in which the sealing member is pressed and contacted against a cylinder. As a result, the sealing member is turned and the sealing of the communicating hole by the sealing member is released. In consequence, a number of components may be reduced and assembly characteristics of the pretensioner mechanism may be improved.

5 Claims, 14 Drawing Sheets

WEBBING TAKE-UP DEVICE

CROSS-REFERENCE TO RELATED APPLICATION

This application claims priority under 35 USC 119 from Japanese Patent Application No. 2014-075652 filed Apr. 1, 2014, the disclosure of which is incorporated by reference herein.

BACKGROUND

Field of the Invention

The present invention relates to a webbing take-up device in which a take-up member is rotated in a take-up direction due to a moving member moving to one side.

Related Art

In a webbing take-up device recited in Japanese Patent Application Laid-Open (JP-A) No. 2003-252172, a piston is accommodated in a cylinder, a packing (seal) is fitted in a gas venting hole in the piston, and a retainer is disposed in a resiliently compressed state between an upper side opening of the gas venting hole and the cylinder. When gas is supplied to a lower side of the piston, the piston moves to the upper side, and a take-up shaft is rotated in a take-up direction. Thereafter, when rotating of the take-up shaft in a pull-out direction is allowed by a force limiter mechanism, the piston is moved to the lower side due to rotating of the take-up shaft in the pull-out direction in a state in which the retainer is in contact with the cylinder. As a result, the retainer is turned and the fitting of the packing in the gas venting hole of the piston is released.

When this webbing take-up device is being assembled, in addition to the packing being fitted into the gas venting hole of the piston, it is necessary that the retainer is disposed between the upper side opening of the gas venting hole and the cylinder.

SUMMARY

In consideration of the situation described above, a webbing take-up device that improves assembly characteristics is provided.

A webbing take-up device according to a first aspect includes: a webbing that can be applied to an occupant of a vehicle; a take-up member onto which the webbing is taken up, by the take-up member being rotated in a take-up direction, the take-up member being rotated in a pull-out direction by the webbing being pulled out; a moving member in which a communicating hole is provided, the communicating hole communicating between one side and another side of the moving member, and the take-up member being rotated in the take-up direction by the moving member moving toward the one side; a restricting member that is provided at the communicating hole and restricts communication through the communicating hole; an accommodating member in which the moving member is accommodated, the moving member being moved to the one side by gas being supplied to the accommodating member at another side of the moving member; and a force limiter mechanism that allows rotating of the take-up member in the pull-out direction when a load from the occupant that is at least a predetermined load or more acts on the take-up member via the webbing, wherein, when the force limiter mechanism allows rotating of the take-up member in the pull-out direction, the moving member moves to the another side due to rotating of the take-up member in the pull-out direction in a state in which the restricting member is in contact with the accommodating member, and the restricting member allows communication through the communicating hole.

In a webbing take-up device according to a second aspect, in the webbing take-up device according to the first aspect, by the moving member being moved to the another side in the state in which the restricting member is in contact with the accommodating member, the restricting member is caused to be turned and allows communication through the communicating hole.

In a webbing take-up device according to a third aspect, in the webbing take-up device according to the first or second aspect, the restricting member is compressed between the accommodating member and the moving member by pressure of the gas at the another side of the moving member, whereby allowance of communication through the communicating hole is enabled.

Further, it is possible in the above aspects that the communicating hole is opened at: a supply-side of the moving member, at which the gas is supplied, and a facing side of the moving member, at which the moving member faces an inner face of the accommodating member in a state in which the moving member is accommodated in the accommodating member; and the restricting member can be in contact with the inner face of the accommodating member at the facing-side.

Further, it is possible in the above aspects that an accommodating portion is formed at the moving member at the facing side, the accommodating portion communicating through the communicating hole and enabling to accommodate the restricting member.

Further, it is possible in the above aspects that, by the moving member being moved to the another side in the state in which the restricting member is in contact with the inner face of the accommodating member, the restricting member is caused to be turned and relatively moved to the accommodating portion side, whereby allows communication through the communicating hole.

In the webbing take-up device according to the first aspect, the communicating hole is provided in the moving member. The communicating hole communicates between the one side and the another side of the moving member. The restricting member is provided in the communicating hole, and restricts communication through the communicating hole.

The moving member is accommodated in the accommodating member. The gas is supplied to the another side of the moving member and the moving member moves to the one side. As a result, the take-up member is rotated in the take-up direction and the webbing is taken up onto the take-up member.

When the load from the occupant that is at least the predetermined load or more acts on the take-up member via the webbing, the force limiter mechanism allows rotating of the take-up member in the pull-out direction, and pulling out of the webbing from the take-up member is allowed.

When the force limiter mechanism allows the rotating of the take-up member in the pull-out direction, the moving member is moved to the another side by the rotating of the take-up member in the pull-out direction in the state in which the restricting member is in contact with the accommodating member, and the restricting member allows communication through the communicating hole.

Therefore, At a time in which the webbing take-up device is being assembled, it is sufficient to provide the restricting member in the communicating hole. Thus, assembly characteristics may be improved.

In the webbing take-up device according to the second aspect, the moving member is moved to the another side in the state in which the restricting member is in contact with the accommodating member. As a result, the restricting member is turned and allows communication through the communicating hole. Therefore, the restricting member can allow communication through the communicating hole effectively.

In the webbing take-up device according to the third aspect, the restricting member is compressed between the moving member and the accommodating member by the pressure of the gas at the another side of the moving member. Thus, communication through the communicating hole is made allowable. Therefore, the restricting member can allow communication through the communicating hole even if the moving member does not move to the another side.

BRIEF DESCRIPTION OF THE DRAWINGS

Exemplary embodiment of the invention will be described in detail with reference to the following figures, wherein.

DETAILED DESCRIPTION

Figure 1:
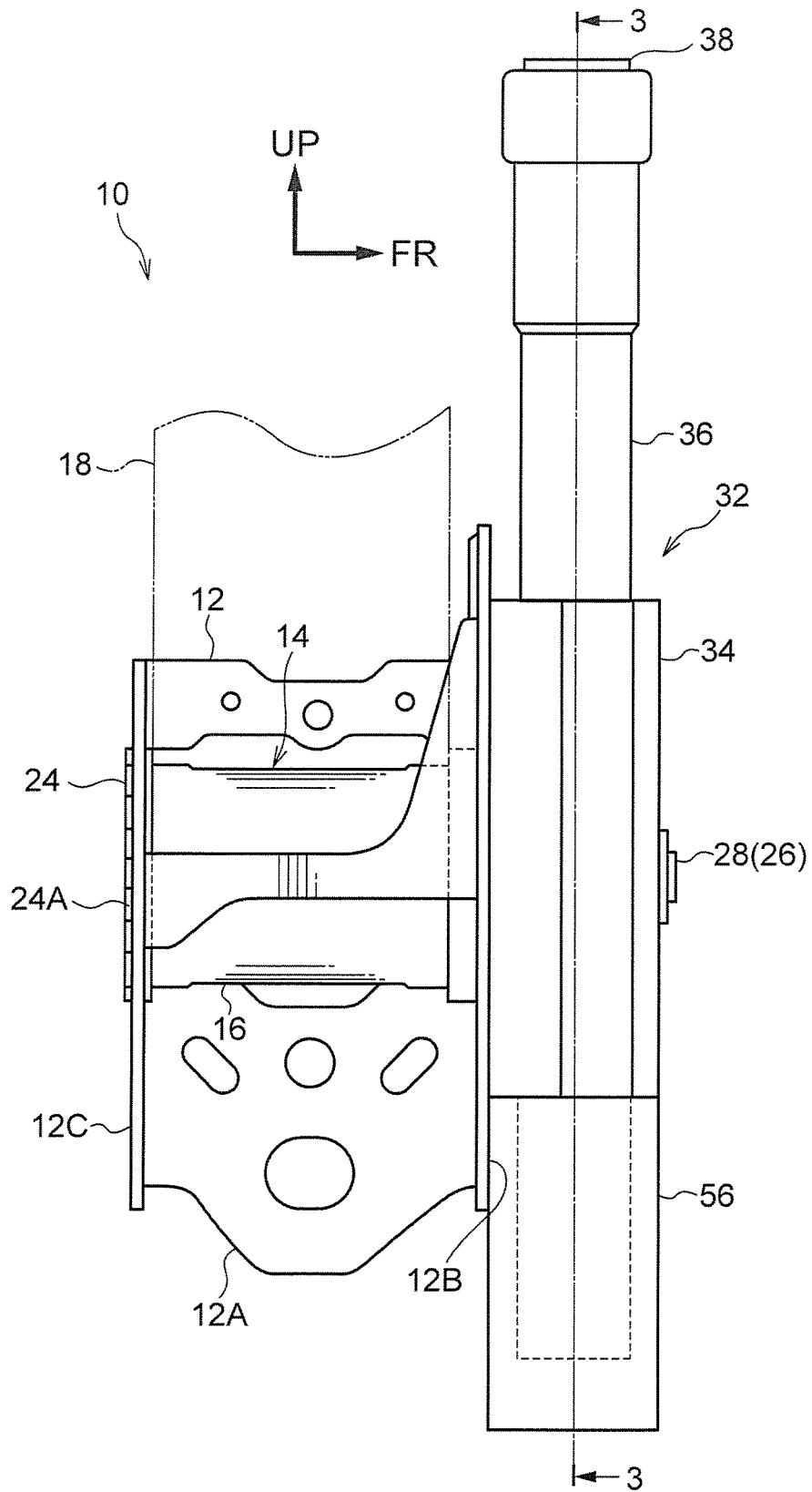
FIG. 1 is a front view showing a webbing take-up device in accordance with an exemplary embodiment of the present invention.
Figure 2:
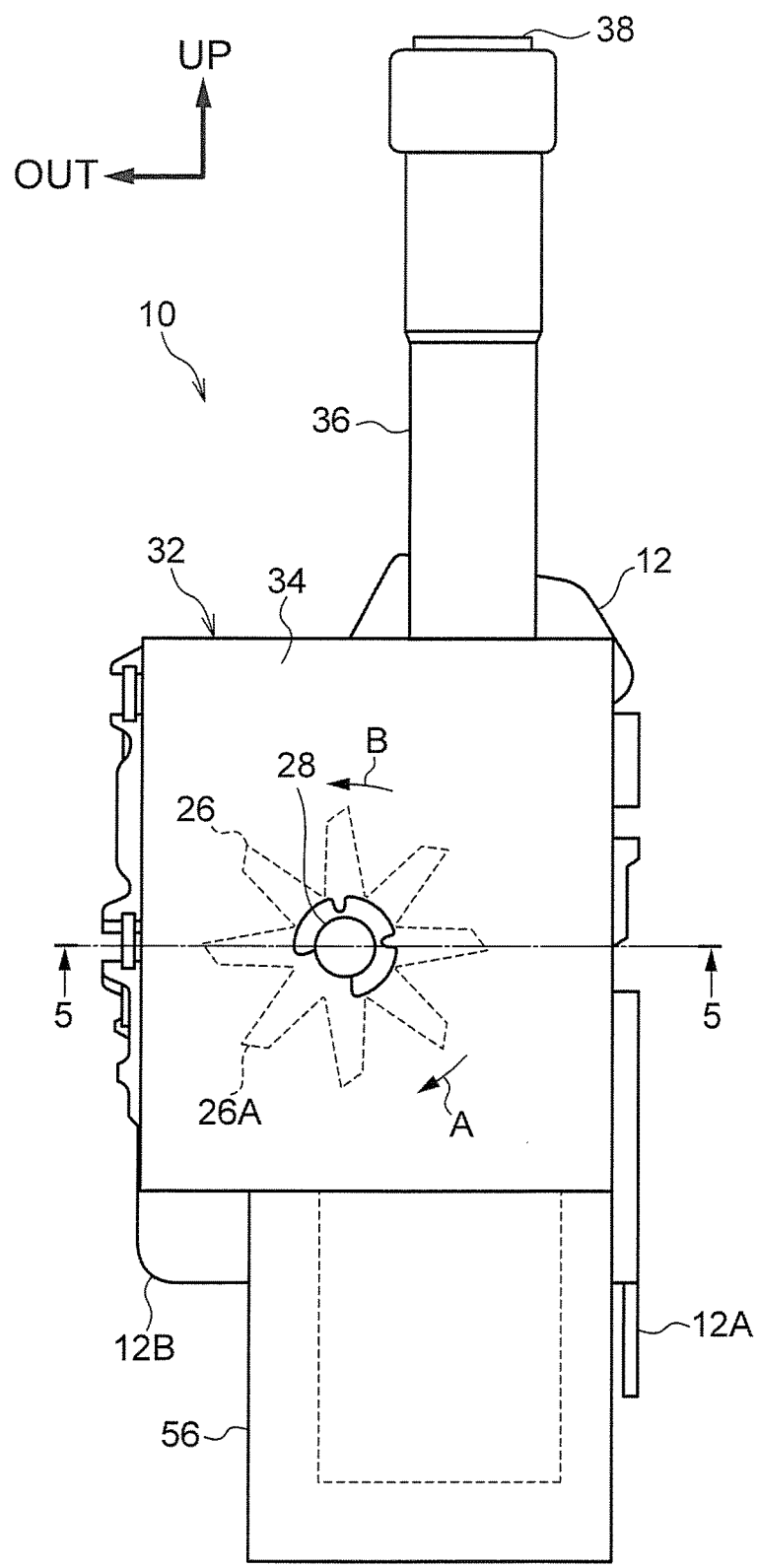
FIG. 2 is a side view, viewed from one side direction, showing the webbing take-up device in accordance with the exemplary embodiment of the present invention.
Figure 5:
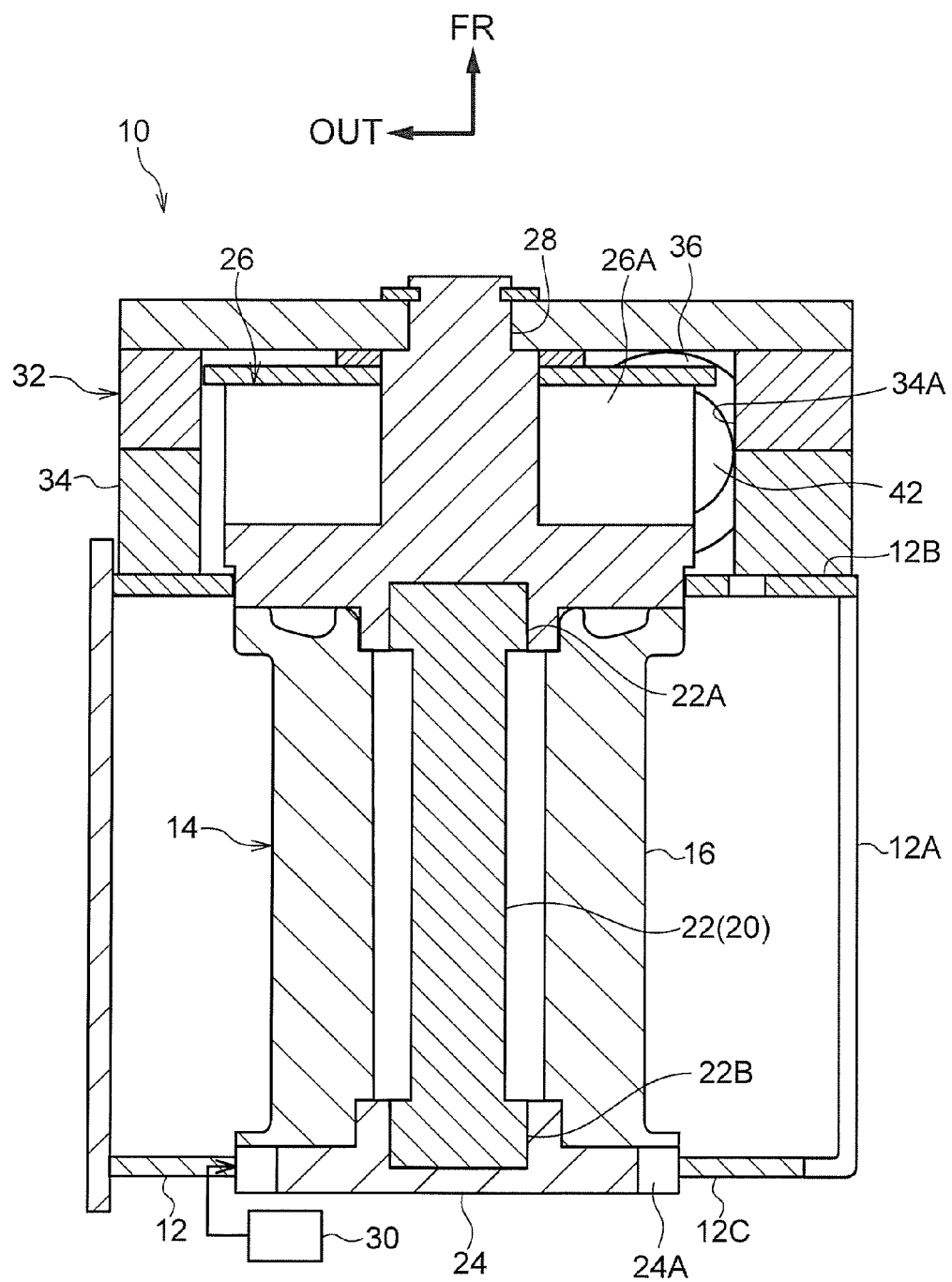
FIG. 5 is a sectional diagram (a section cut along line 5-5 of FIG. 2), viewed from a lower direction, showing the webbing take-up device in accordance with the exemplary embodiment of the present invention.

FIG. 1 shows a front view of a webbing take-up device 10 according to an exemplary embodiment of the present invention, and FIG. 2 shows a side view of the webbing take-up device 10 viewed from one side direction. FIG. 5 shows a sectional diagram (a section cut along line 5-5 of FIG. 2) of the webbing take-up device 10 viewed from a lower direction. In the drawings, the vehicle width direction outer side is indicated with the arrow OUT, the vehicle front and rear direction one side is indicated with the arrow FR, and the vehicle upper direction is indicated with the arrow UP.

As shown in FIG. 1, FIG. 2 and FIG. 5, a frame 12, which serves as a support member, and which is fabricated of metal with a "U" shape in cross section in plate shape, is provided at the webbing take-up device 10 of the present exemplary embodiment. The frame 12 is provided with a back plate 12A at a back face (rear face) side, a leg plate 12B to one side, and a leg plate 12C to another side. The webbing take-up device 10 is fixed to, at the back plate 12A of the frame 12, the inside a pillar with a rectangular tube shape (not shown in the drawings) that is a framework member of the vehicle. Thus, the webbing take-up device 10 is disposed in the vehicle. A front face side, one sideward side and the upper side of the webbing take-up device 10 are oriented to, respectively, the vehicle width direction outer side, one side in the vehicle front and rear direction (the vehicle front side or the vehicle rear side) and the vehicle upper side.

A take-up shaft 14 is rotatably supported between the leg plate 12B and the leg plate 12C of the frame 12.

A spool 16, which is fabricated of metal in a substantially circular tube shape, is provided at the take-up shaft 14 to serve as a take-up member. A long belt-shaped webbing 18 (a belt) is taken up, from a base end side thereof, onto the spool 16. The webbing 18 is extended upward from the frame 12 and can be applied to an occupant sitting on a seat (not shown in the drawings) of the vehicle. When the spool 16 is rotated in a take-up direction (the direction of arrow A in FIG. 2), the webbing 18 is taken up onto the spool 16. When the webbing 18 is pulled out from the spool 16, the spool 16 is rotated in a pull-out direction (the direction of arrow B in FIG. 2).

A force limiter mechanism 20 is provided at the take-up shaft 14. The force limiter mechanism 20 is provided with a torsion shaft 22, which is fabricated of metal in a rod shape, that serves as an energy-absorbing member. The torsion shaft 22 is coaxially inserted into the spool 16.

A lock gear 24, which is fabricated of metal in a substantially circular disc shape, is provided at the take-up shaft 14. The lock gear 24 is provided at the side of the spool 16 at which the leg plate 12C is disposed, and serves as a regulation portion (a locking portion). The lock gear 24 rotatably penetrates through the leg plate 12C. The lock gear 24 is disposed coaxially with the spool 16, and is relatively rotatable with respect to the spool 16. Another end 22B of the torsion shaft 22, at the side thereof at which the leg plate 12C is disposed, is non-relative-rotatably joined to the lock gear 24. The lock gear 24 is rotatably integrally with the torsion shaft 22. Ratchet teeth 24A (outward teeth) are plurally formed over the whole of the outer periphery of the lock gear 24.

Figure 3:
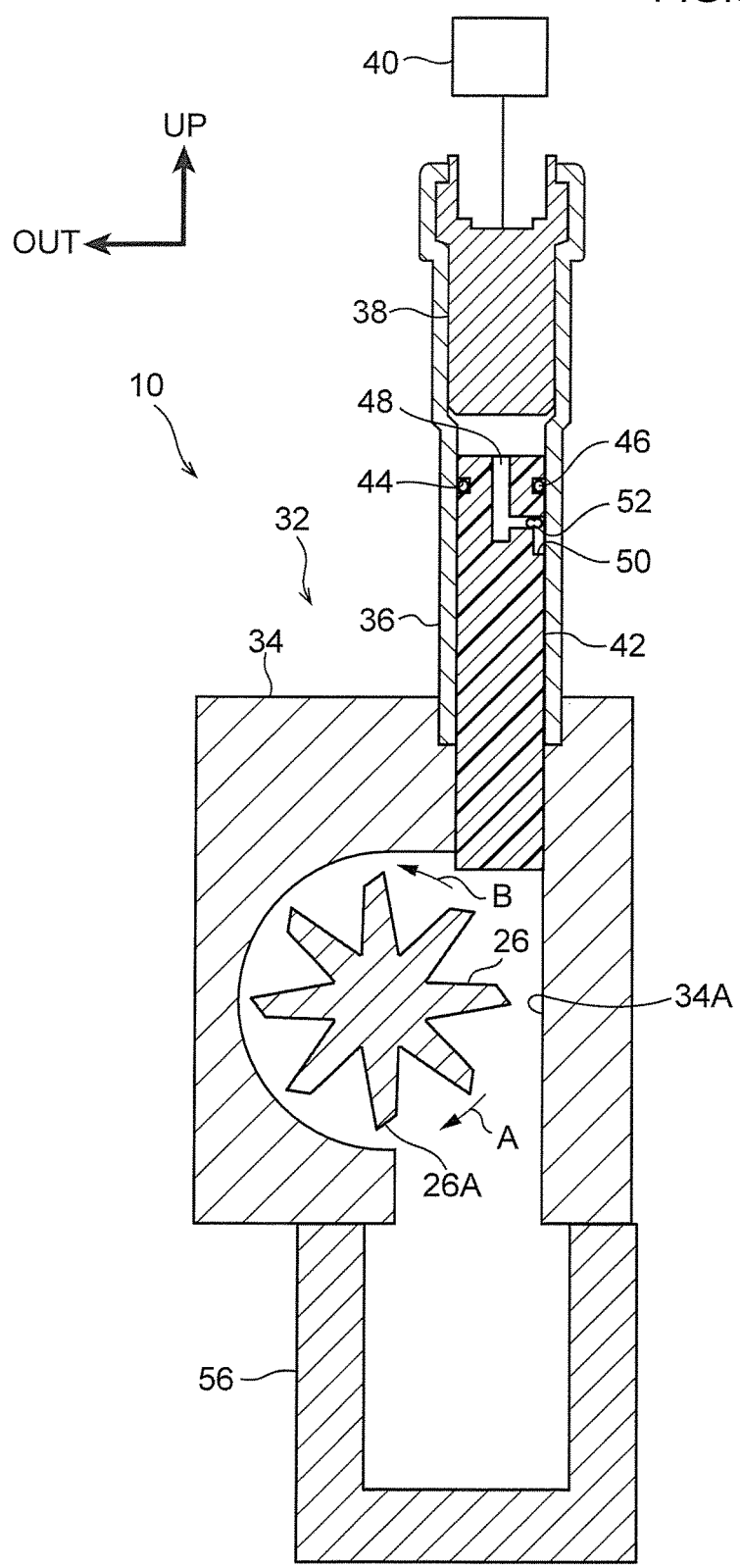
FIG. 3 is a sectional diagram (a section cut along line 3-3 of FIG. 1), viewed from the one side direction, showing the webbing take-up device in accordance with the exemplary embodiment of the present invention.

A pinion 26 (see FIG. 3) fabricated of metal that serves as a rotating member is provided at the take-up shaft 14, at the side of the spool 16 at which the leg plate 12B is disposed. An end portion of the pinion 26, at the side thereof at which the spool 16 is disposed, rotatably penetrates through the leg plate 12B. The pinion 26 is disposed coaxially with the spool 16, the pinion 26 is relatively non-relatively-rotatably joined to the spool 16, and the pinion 26 is non-relatively-rotatably joined to one end 22A of the torsion shaft 22, at the side thereof at which the leg plate 12B is disposed. Thus, the spool 16, the torsion shaft 22, the lock gear 24 and the pinion 26 are rotatably integrally.

Pinion teeth 26A in rectangular plate shapes that serve as engaging portions are plurally formed over the whole of the outer periphery of an axial direction middle portion of the pinion 26. The pinion teeth 26A protrude to the diameter direction outer side of the pinion 26. Distal end portions of the pinion teeth 26A are formed in pointed shapes that are triangular shapes in cross section. Spaces between the pinion teeth 26A are opened to the diameter direction outer side of the pinion 26, but are closed off at both axial direction ends of the pinion 26. A support shaft 28 in a substantially circular rod shape is formed coaxially at an end portion of the pinion 26, at the opposite side thereof from the side at which the spool 16 is disposed.

A spiral spring (not shown in the drawings) is disposed at the outer side of the leg plate 12C of the frame 12 to serve as an urging member. The spiral spring is joined to the lock gear 24, and applies an urging force to the spool 16 in the take-up direction.

A locking mechanism 30 (see FIG. 5) that serves as a regulation unit (a locking unit) is connectable to the lock gear 24. A lock plate (not shown in the drawings) fabricated of metal that serves as a regulation member (a locking member) is provided at the locking mechanism 30. The lock plate is rotatably supported at the leg plate 12B of the frame 12. Locking teeth are formed at the lock plate. At a time of an emergency of the vehicle (when the vehicle rapidly decelerates or when the webbing 18 is suddenly pulled out from the spool 16), the locking mechanism 30 is operated, the lock plate is rotated, and the locking teeth mesh (engage) with the ratchet teeth 24A of the lock gear 24. As a result, rotating of the lock gear 24 in the pull-out direction is regulated (locked), and rotating of the spool 16 in the pull-out direction is restricted (although rotating of the spool 16 in the take-up direction is allowed).

A pretensioner mechanism 32 (see FIG. 3) is provided at the outer side of the leg plate 12B of the frame 12. The pinion 26 of the take-up shaft 14 structures the pretensioner mechanism 32.

A body 34, which is fabricated of metal in the shape of a frame with a bottom, is fixed to the outer side of the leg plate 12B of the frame 12. The interior of the body 34 is opened to the side thereof at which the leg plate 12B is disposed, and the pinion 26 of the take-up shaft 14 is disposed thereinside. The support shaft 28 of the pinion 26 penetrates through the bottom wall of the body 34 at the opposite side thereof from the side at which the leg plate 12B is disposed. The bottom wall of the body 34 supports the support shaft 28 to be freely rotatable. A flat surface-shaped regulation surface 34A is formed at an inner face of the body 34, at the side thereof at which the back plate 12A is disposed. The regulation surface 34A is disposed in a vicinity of the pinion 26 and is disposed to be parallel with the axial direction of the pinion 26 and the up and down direction.

A cylinder 36 (a pipe; see FIG. 6), which is fabricated of metal in a substantially circular tube shape, that serves as an accommodating member is fixed to an upper portion of the body 34. The cylinder 36 extends to the upper side from the body 34. A lower end (distal end) of the cylinder 36 is disposed at the upper side of a region of the pinion 26, that is at the side at which the back plate 12A is disposed, inside the body 34. The interior of the cylinder 36 is in communication with the interior of the body 34.

A gas generator 38 (see FIG. 6) with a substantially circular rod shape is inserted into and fixed in an upper end portion (a base end portion) of the cylinder 36 to serve as a supply unit. The gas generator 38 closes off the upper end of the cylinder 36. The gas generator 38 is electronically connected to a control device 40 of the vehicle. At a time of the emergency of the vehicle (when a collision of the vehicle is sensed), the pretensioner mechanism 32 is operated under the control of the control device 40, the gas generator 38 momentarily produces high-pressure gas, and the gas generator 38 supplies the gas to the upper end the lower side of the interior of the cylinder 36.

A piston 42 (see FIG. 6) in a circular rod shape that serves as a moving member is provided inside the cylinder 36. An upper end of the piston 42 is disposed in a vicinity of the lower side of the gas generator 38. A lower end portion of the piston 42 projects to the lower side from the cylinder 36, and the lower end of the piston 42 is disposed in the vicinity of the upper side of the region of the pinion 26, that is at the side at which the back plate 12A is disposed. The lower end portion of the piston 42 opposes (faces) the pinion teeth 26A of the pinion 26 in the up and down direction. A diameter of the piston 42 is slightly smaller than an internal diameter of the cylinder 36. Thus, a gap is provided between (an outer periphery face of) the piston 42 and (an inner periphery face of) the cylinder 36. A material of the piston 42 is a soft resin such as nylon (PA), polyvinyl chloride (PVC), an elastomer or the like. The pinion teeth 26A of the pinion 26 can easily bite into (to be particular, pierce) the piston 42. Moreover, the piston 42 is deformable to curve in a direction perpendicular to the axis thereof.

Figure 6:
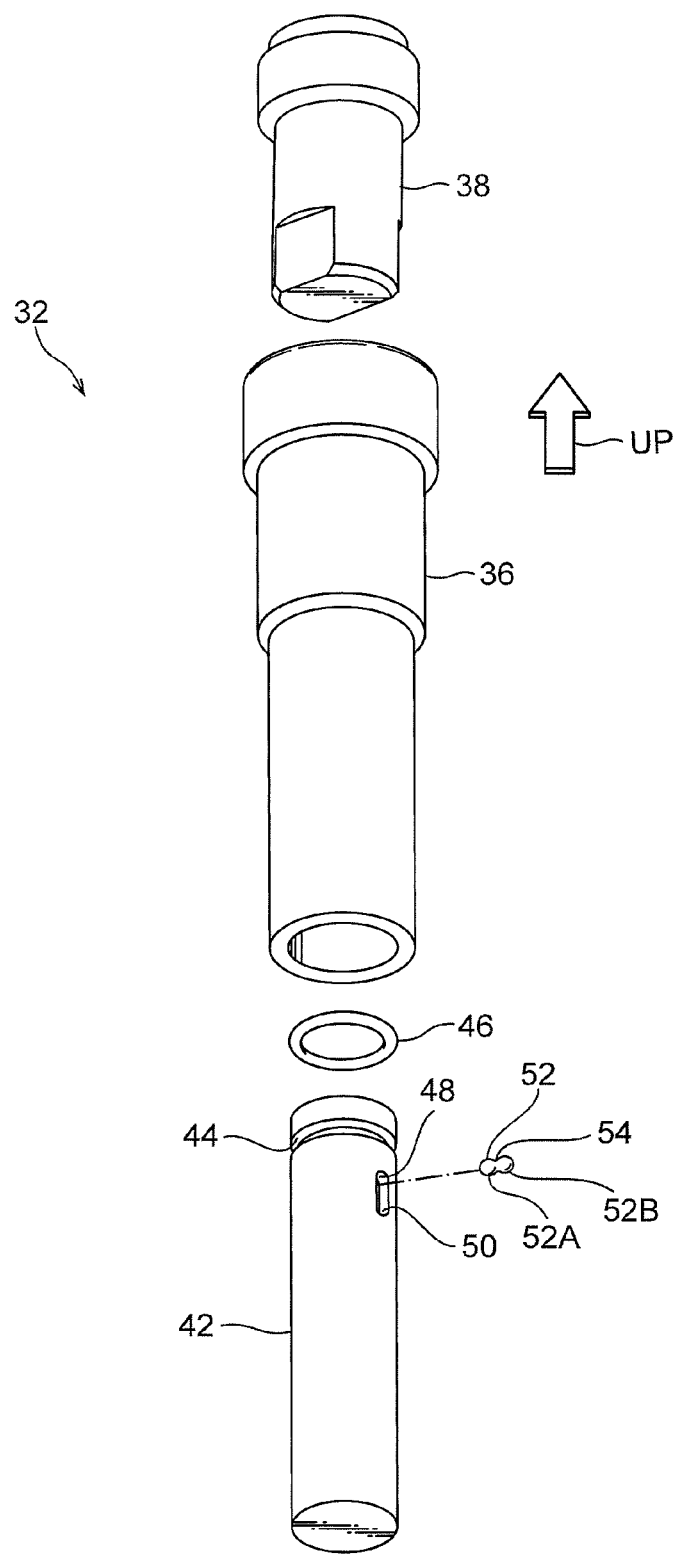
FIG. 6 is an exploded perspective view showing principal portions of the pretensioner mechanism of the webbing take-up device in accordance with the exemplary embodiment of the present invention.
Figure 7:
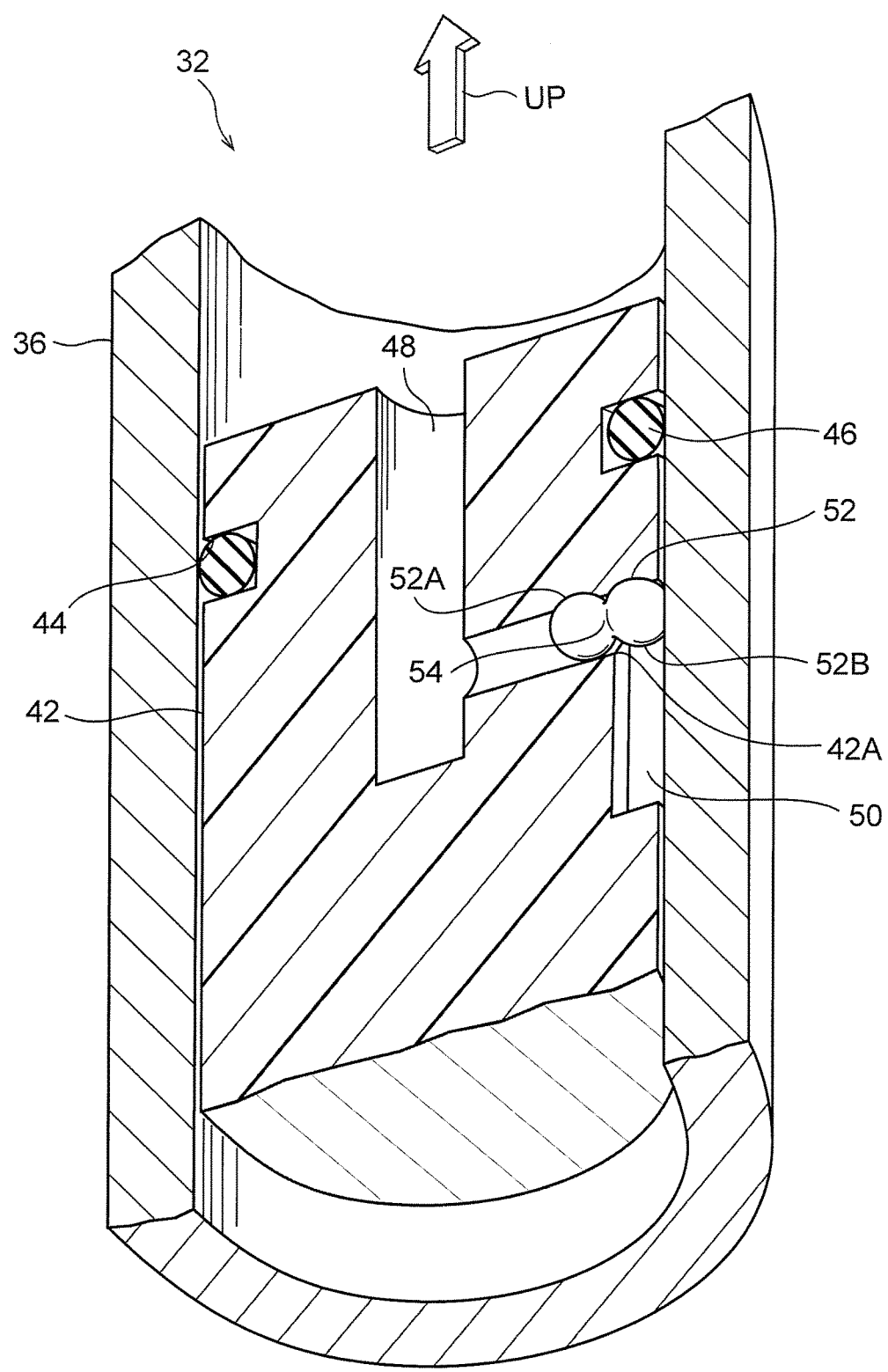
FIG. 7 is a cutaway perspective view showing the principal portions of the pretensioner mechanism of the webbing take-up device in accordance with the exemplary embodiment of the present invention.

As is illustrated in detail in FIG. 6 and FIG. 7, a fixing slot (groove) 44 with a rectangular shape in cross section is coaxially formed along the whole circumference of an upper portion of the piston 42. The fixing slot 44 opens to the outer side in the diameter direction of the piston 42. An O-ring 46 in a toroidal (annulus ring) shape that serves as a sealing portion is coaxially inserted into and fixed in the fixing slot 44. The O-ring 46 is fabricated of rubber and features resilience and sealing ability. The O-ring 46 is movable integrally with the piston 42. The O-ring 46, in a resiliently compressed state, is contacted and pressed against an inner face of the fixing slot 44 and the inner periphery face of the cylinder 36. Thus, the O-ring 46 seals between the piston 42 (the inner face of the fixing slot 44) and (the inner periphery face of) the cylinder 36.

A circular communicating hole 48 is formed in an upper portion of the piston 42. The communicating hole 48 has a substantial "L" shape in a side view cross section. An upper side portion of the communicating hole 48 is disposed coaxially with the piston 42 and opens at the upper side (gas supply-side) of the piston 42. A lower side portion of the communicating hole 48 extends in the diameter direction of the piston 42 and opens at the diameter direction outer side (cylinder 36 facing-side) of the piston 42. The lower side portion of the communicating hole 48 is disposed at the lower side with respect to the O-ring 46. Thus, the communicating hole 48 communicates between the upper side and the lower side of the piston 42 (namely, of the O-ring 46).

An accommodating cavity (accommodating hole) 50 with a rectangular shape in cross section that serves as an accommodating portion is formed in an upper portion of the piston 42, at the lower side of the communicating hole 48. The accommodating cavity 50 is open to the diameter direction outer side of the piston 42. At the upper side of the accommodating cavity 50, the accommodating cavity 50 is in communication with the lower side portion of the communicating hole 48. The accommodating cavity 50 extends in parallel with the axial direction of the piston 42.

A sealing member 52 that serves as a restricting member is inserted into the lower side portion of the communicating hole 48 of the piston 42. The sealing member 52 is fabricated of rubber and features resilience and sealing ability. The sealing member 52 is formed in a long shape which is along the direction in which the lower side portion of the communicating hole 48 extends. A base (proximal) end portion 52A (a portion at the inner side in the diameter direction of the piston 42) and a distal end portion 52B (a portion at the outer side in the diameter direction of the piston 42) of the sealing member 52 are respectively formed in substantially spherical shapes. A recess portion 54 with a substantially triangular shape in cross-section is formed along the whole circumference of the sealing member 52 between the base end portion 52A and the distal end portion 52B. The recess portion 54 opens to the outer side of the outer periphery of the sealing member 52. The base end portion 52A of the sealing member 52 is fitted (press-inserted) into the lower side portion of the communicating hole 48 in a resiliently compressed state. Thus, the base end portion 52A of the sealing member 52 seals the lower side portion of the communicating hole 48 and restricts (prevents) communication through the communicating hole 48 between the upper side and lower side of the piston 42 (the upper side and lower side of the O-ring 46). The distal end portion 52B of the sealing member 52 is disposed at the upper side of the accommodating cavity 50 of the piston 42. The distal end portion 52B of the sealing member 52 is disposed so as to be able to contact (or to contact) with the inner periphery face of the cylinder 36.

Namely, the sealing member 52 has a shape (length in a longitudinal direction) such that, at the lower side portion of the communicating hole 48 in the vicinity of the inner periphery face of the cylinder 36, the base end portion 52A of the sealing member 52 seals the communicating hole 48 (restricts (prevents) communication through the communicating hole 48), at the same time, the distal end portion 52B of the sealing member 52 contacts with the inner periphery face of the cylinder 36.

As shown in FIG. 1 to FIG. 3 and FIG. 5, a case 56, which is fabricated of metal in a box shape, that serves as a receiving member is fixed to the outer side of the leg plate 12B of the frame 12, at the lower side of the body 34. The interior of the case 56 is open to the upper side thereof, and the interior of the body 34 is open to the lower side thereof. Thus, the interior of the case 56 is in communication with the interior of the body 34.

Next, operation of the present exemplary embodiment is described.

In the webbing winding device 10 with the structure described above, when the webbing 18 is pulled out from the spool 16 and the webbing 18 is applied to the occupant sitting on the seat of the vehicle, slack of the webbing 18 is eliminated by the spiral spring applying the urging force to the spool 16 in the take-up direction.

At the time of an emergency of the vehicle, the locking mechanism 30 is operated, the lock plate is rotated, and the locking teeth of the lock plate are meshed with the ratchet teeth 24A of the lock gear 24. As a result, rotation of the lock gear 24 in the pull-out direction is restricted, and rotation of the spool 16 in the pull-out direction is restricted. Therefore, pulling out of the webbing 18 from the spool 16 is restricted, and the occupant is restrained by the webbing 18.

Figure 4:
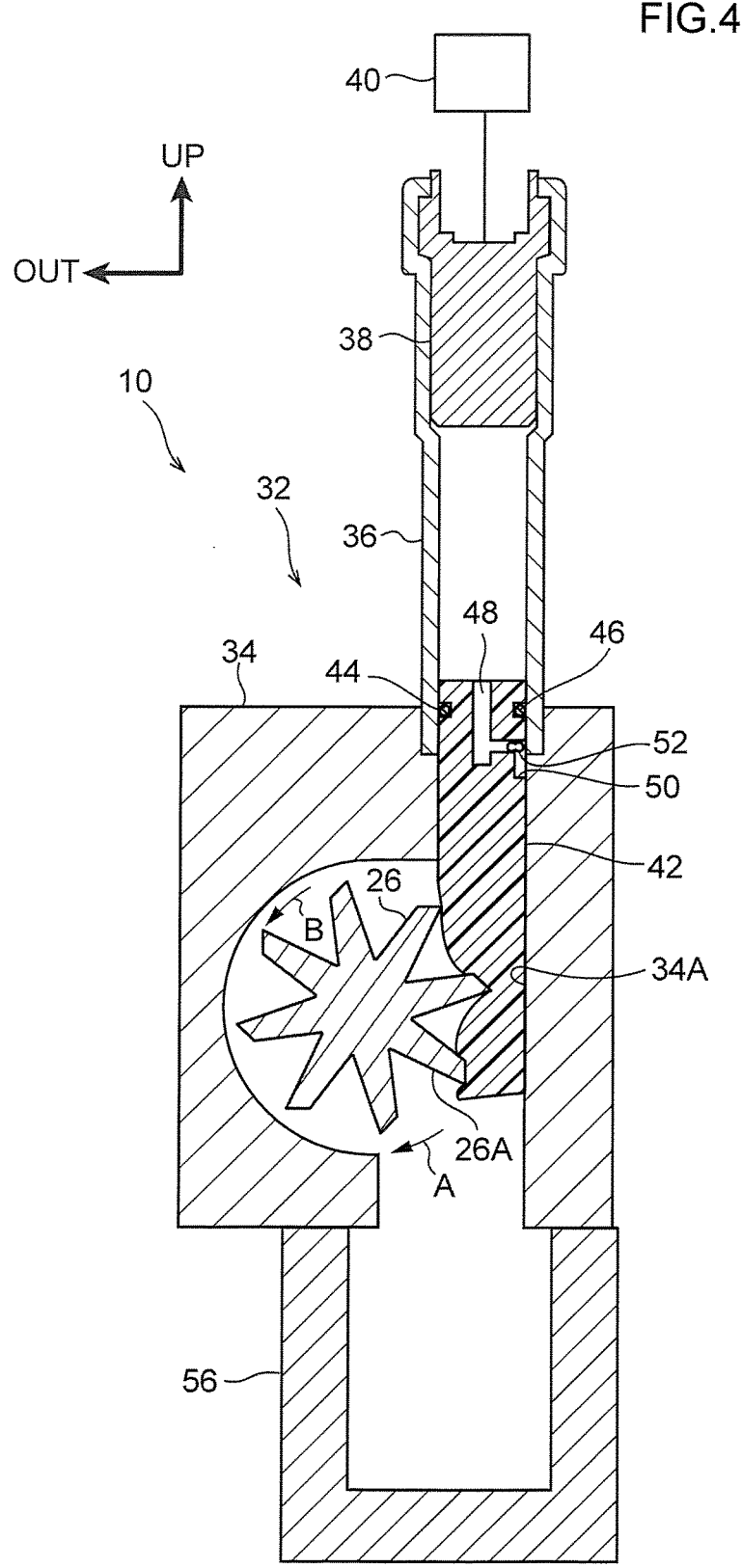
FIG. 4 is a sectional diagram (a section cut along line 3-3 of FIG. 1) showing the webbing take-up device in accordance with the exemplary embodiment of the present invention during operation of a pretensioner mechanism.

As shown in FIG. 4, at the time of an emergency of the vehicle, the pretensioner mechanism 32 is operated under the control of the control device 40. Thus, the gas generator 38 momentarily produces high-pressure gas and supplies the gas to the lower side of the upper end of the interior of the cylinder 36. As a result, the piston 42 is subjected to (received) pressure of the gas (a moving force) from the upper side (another side) thereof, and the piston 42 is moved to the lower side (one side) thereof while sealing between the piston 42 and the cylinder 36 is maintained by the O-ring 46. Hence, the pinion teeth 26A of the pinion 26 bite into (to be particular, pierce) the piston 42, while movement of the piston 42 to the opposite side thereof from the side at which the pinion 26 is disposed is restricted by the regulation surface 34A at the inner face of the body 34. Thus, the pinion 26 is rotated in the take-up direction by the movement of the piston 42 to the lower side, and the spool 16 is rotated in the take-up direction. In consequence, the webbing 18 is taken up onto the spool 16 and a restraining force on the occupant by the webbing 18 is increased. The piston 42 that passes by the pinion 26 and moves to the lower side thereof is accommodated in the case 56.

Subsequently, when a load that is at least a force limiter load (a torsional deformation resistance load of the torsion shaft 22, which is a predetermined load) or more from the occupant acts on the spool 16 in the pull-out direction via the webbing 18, the force limiter mechanism 20 is operated and the torsion shaft 22 is torsionally deformed. Therefore, rotating of the one end 22A of the torsion shaft 22 in the pull-out direction relative to the another end 22B is allowed, and the torsion shaft 22 allows rotating of the spool 16 in the pull-out direction. In consequence, pulling out of the webbing 18 from the spool 16 is allowed, and a load acting on the occupant from the webbing 18 is restricted to the force limiter load. In addition, kinetic energy of the occupant is absorbed by the torsional deformation of the torsion shaft 22.

When the force limiter mechanism 20 is operated, the pinion 26 is rotated in the pull-out direction integrally with the spool 16, and the piston 42 is moved to the upper side thereof.

Here, the communicating hole 48 of the piston 42 communicates between the upper side and lower side of the piston 42 (of the O-ring 46), and the base end portion 52A of the sealing member 52 seals the lower side portion of the communicating hole 48, restricting communication by the communicating hole 48 between the upper side and lower side of the piston 42 (of the O-ring 46).

Figure 8:
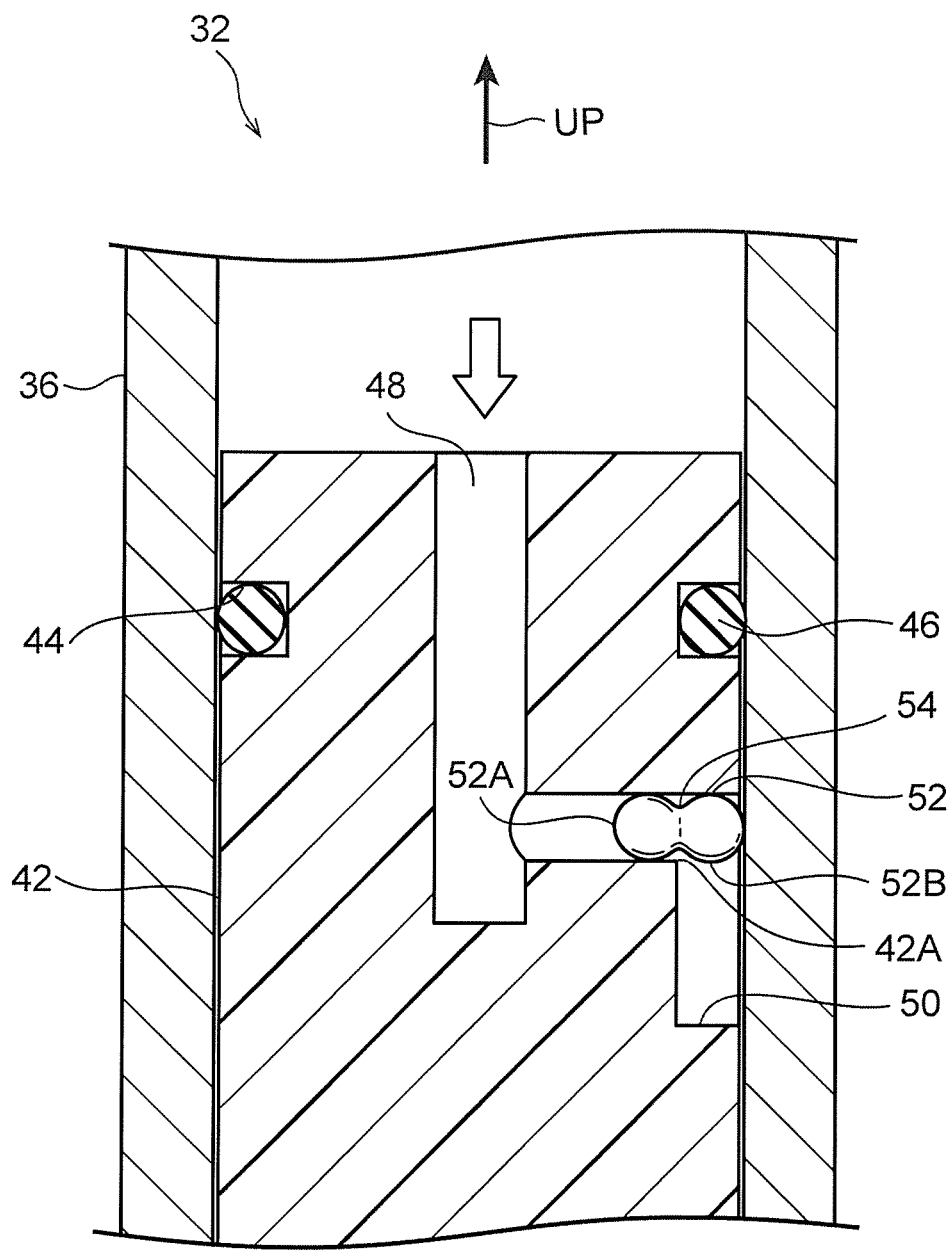
FIG. 8 is an enlarged sectional diagram showing the pretensioner mechanism of the webbing take-up device in accordance with the exemplary embodiment of the present invention during operation.

As illustrated in FIG. 8, when the pretensioner mechanism 32 is operated, the gas from the gas generator 38 flows through in the communicating hole 48 and due thereto the sealing member 52 is pushed to the outer side in the diameter direction of the piston 42. Thus, the distal end portion 52B of the sealing member 52 is pressed against the inner periphery face of the cylinder 36, and movement of the sealing member 52 to the outer side in the diameter direction of the piston 42 is stopped. Further, when the piston 42 is moving to the lower side and a frictional force toward the upper side acts on the distal end portion 52B of the sealing member 52 between the distal end portion 52B of the sealing member 52 and the inner periphery face of the cylinder 36, movement of the sealing member 52 toward the upper side relative to the piston 42 is stopped by an upper side periphery face of the lower side portion of the communicating hole 48.

Therefore, the sealing of the lower side portion of the communicating hole 48 by the base end portion 52A of the sealing member 52 is maintained. Thus, an outflow of the gas through the communicating hole 48 from the upper side of the piston 42 (of the O-ring 46) to the lower side of the piston 42 (of the O-ring 46) is suppressed (prevented), and a lowing in the pressure of the gas at the upper side of the piston 42 (of the O-ring 46) is suppressed (prevented). Accordingly, a large movement force of the piston 42 toward the lower side can be produced, and a large rotating force in the take-up direction can be produced at the pinion 26 and the spool 16. Therefore, a large take-up force of the webbing 18 onto the spool 16 can be produced, and a restraining force on the occupant from the webbing 18 can be effectively increased.

Figure 9:
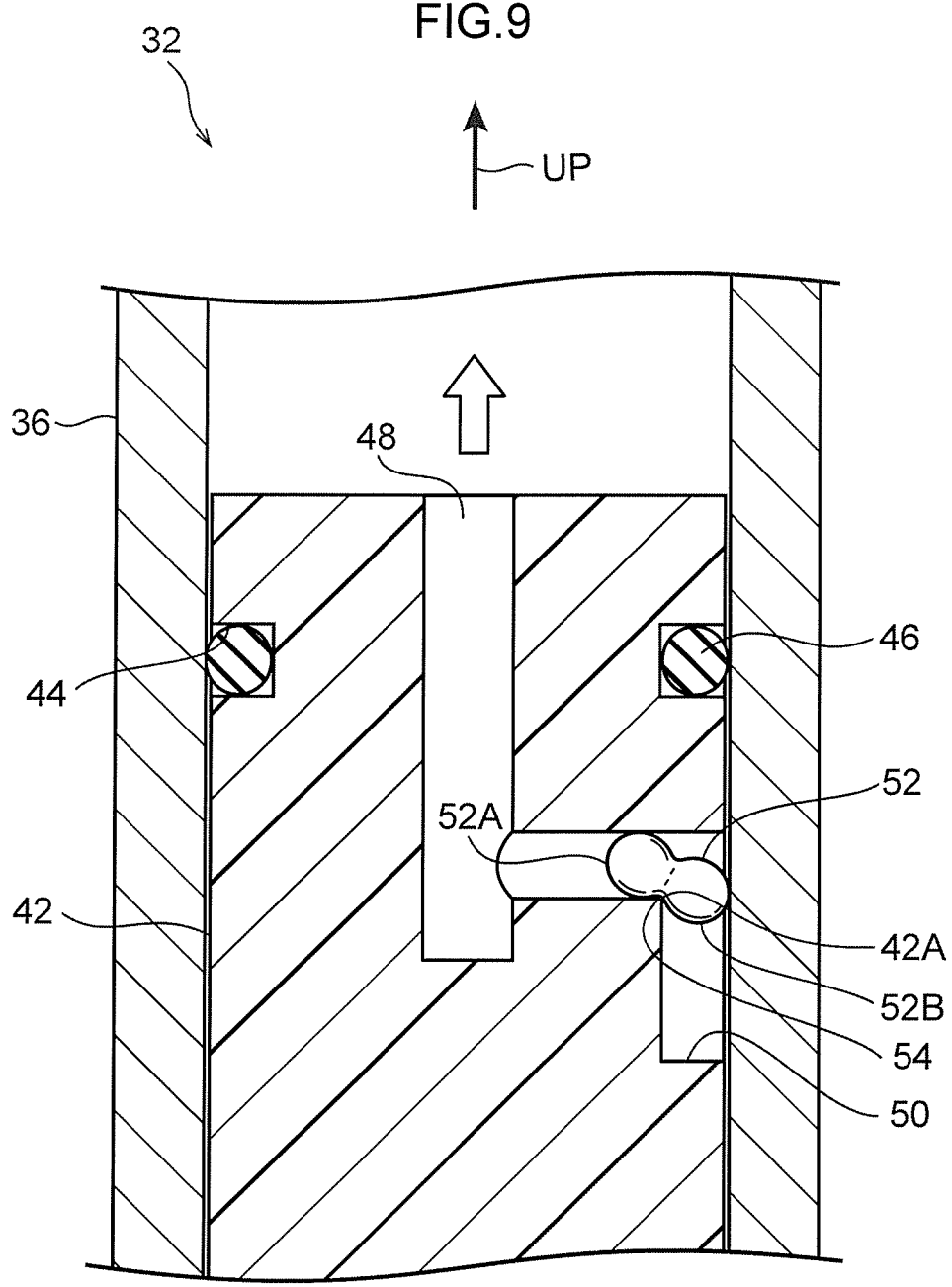
FIG. 9 is an enlarged sectional diagram showing a first stage during operation of a force limiter mechanism of the webbing take-up device in accordance with the exemplary embodiment of the present invention.
Figure 10:
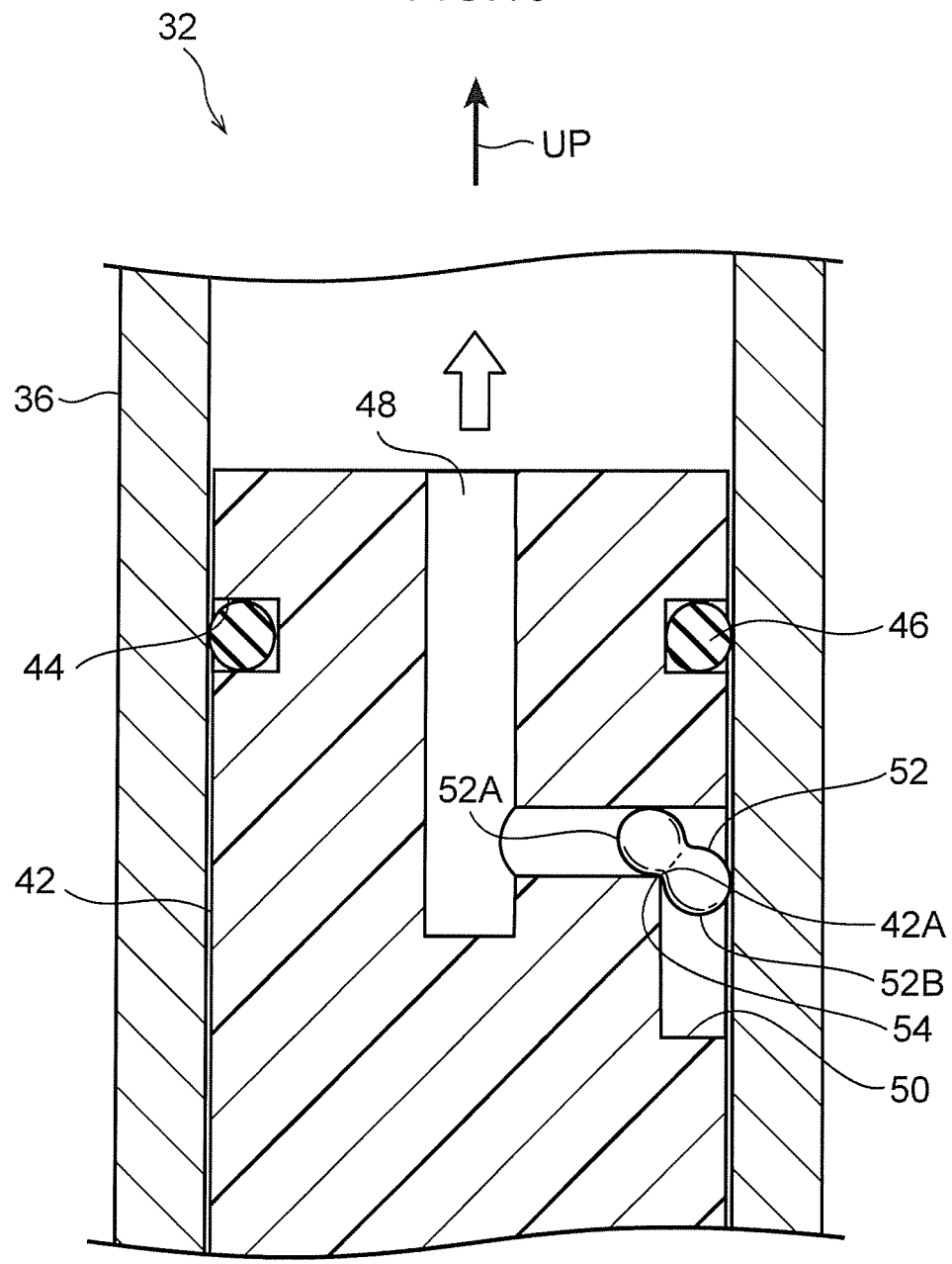
FIG. 10 is an enlarged sectional diagram showing a second stage during the operation of the force limiter mechanism of the webbing take-up device in accordance with the exemplary embodiment of the present invention.
Figure 11:
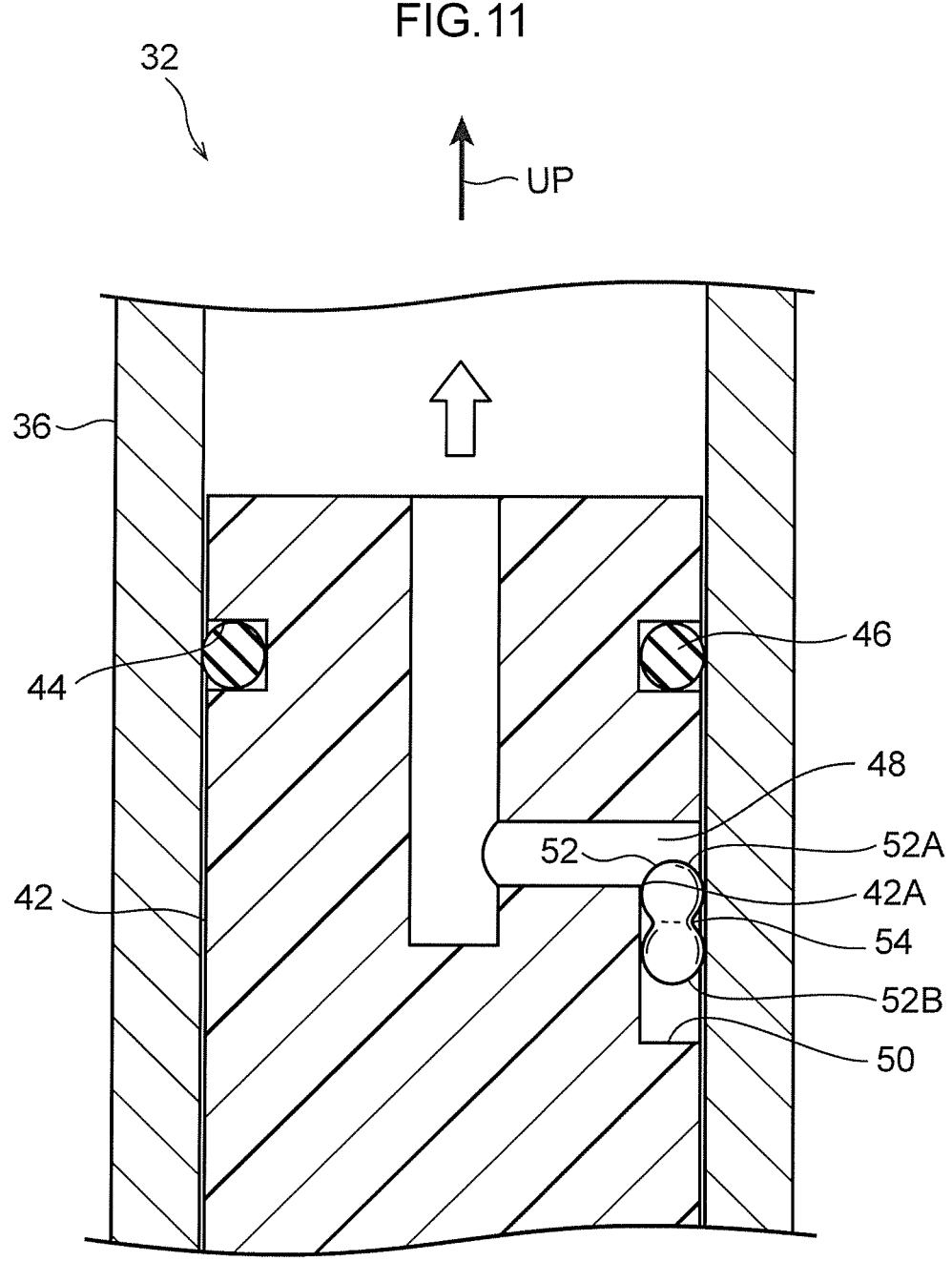
FIG. 11 is an enlarged sectional diagram showing a third stage during operation of the pretensioner mechanism of the webbing take-up device in accordance with the exemplary embodiment of the present invention.

On the other hand, as illustrated in FIG. 9 to FIG. 11, when the force limiter mechanism 20 is operated, the piston 42 is moved to the upper side in a state in which the moving toward the upper side of the distal end portion 52B of the sealing member 52 is suppressed by a frictional force between the distal end portion 52B and the inner periphery face of the cylinder 36 due to the distal end portion 52B of the sealing member 52 being pressed against the inner periphery face of the cylinder 36. As a result, the base end portion 52A is relatively moved to the accommodating cavity 50 side, the sealing member 52 is turned such that the base end portion 52A is turned to the upper side relative to the distal end portion 52B and to the piston 42 diameter direction outer side. Moreover, movement of the sealing member 52 toward the upper side is suppressed by the frictional force between the inner periphery face of the cylinder 36. Thus, as a result of the movement of the piston 42 toward the upper side, the sealing member 52 is accommodated in the accommodating cavity 50 of the piston 42.

Due thereto, the sealing of the lower side portion of the communicating hole 48 by the base end portion 52A of the sealing member 52 is released and communication through the communicating hole 48 between the upper side and lower side of the piston 42 (of the O-ring 46) is allowed. Therefore, gas remaining in the cylinder 36 at the upper side of the piston 42 (of the O-ring 46) flows from the upper side of the piston 42 (of the O-ring 46) to the lower side via the communicating hole 48 and the gap between the piston 42 and the cylinder 36, and therefore the pressure of the gas is lowered. Hence, the restriction by such gas on movement of the piston 42 toward the upper side and the restriction on rotating of the pinion 26 and the spool 16 in the pull-out direction can be suppressed, and an increase in the load acting on the occupant from the webbing 18 due to such gas can be suppressed.

In addition, when the force limiter mechanism 20 is operated and the sealing of the lower side portion of the communicating hole 48 by the base end portion 52A of the sealing member 52 is released as described above, the base end portion 52A of the sealing member 52 is turned relative to the distal end portion 52B. Therefore, the sealing of the lower side portion of the communicating hole 48 by the base end portion 52A of the sealing member 52 can be released effectively, and the gas in the cylinder 36 at the upper side of the piston 42 (of the O-ring 46) can be effectively allowed to flow from the upper side to the lower side of the piston 42 (of the O-ring 46).

Moreover, when the force limiter mechanism 20 is operated and the base end portion 52A of the sealing member 52 is turned relative to the distal end portion 52B, a corner portion 42A of the piston 42, which is between the periphery face of the lower side portion of the communicating hole 48 and a periphery face of the accommodating cavity 50, is inserted (entered) into the recess portion 54 which is between the base end portion 52A and distal end portion 52B of the sealing member 52. Therefore, the base end portion 52A of the sealing member 52 can be turned relative to the distal end portion 52B with ease, and the sealing of the lower side portion of the communicating hole 48 by the base end portion 52A of the sealing member 52 can be released with ease.

After the force limiter mechanism 20 has been operated and the base end portion 52A of the sealing member 52 has been turned relative to the distal end portion 52B as described above, the sealing member 52 is accommodated in the accommodating cavity 50 of the piston 42. Therefore, the release of "the sealing of the lower side portion of the communicating hole 48 by the base end portion 52A of the sealing member 52" can be maintained, and the gas in the cylinder 36 at the upper side of the piston 42 (of the O-ring 46) can be even more effectively allowed to flow from the upper side to the lower side of the piston 42 (of the O-ring 46).

Furthermore, when the force limiter mechanism 20 is operated and the sealing of the lower side portion of the communicating hole 48 by the base end portion 52A of the sealing member 52 is released, gas at a high temperature in the cylinder 36 at the upper side of the piston 42 (of the O-ring 46) passes, via the communicating hole 48, the sealing member 52. As a result, the sealing member 52 is fused by such gas. Consequently, the release of "the sealing of the lower side portion of the communicating hole 48 by the base end portion 52A of the sealing member 52" can be maintained effectively, and the such gas can be even more effectively allowed to flow from the upper side to the lower side of the piston 42 (of the O-ring 46).

Figure 12:
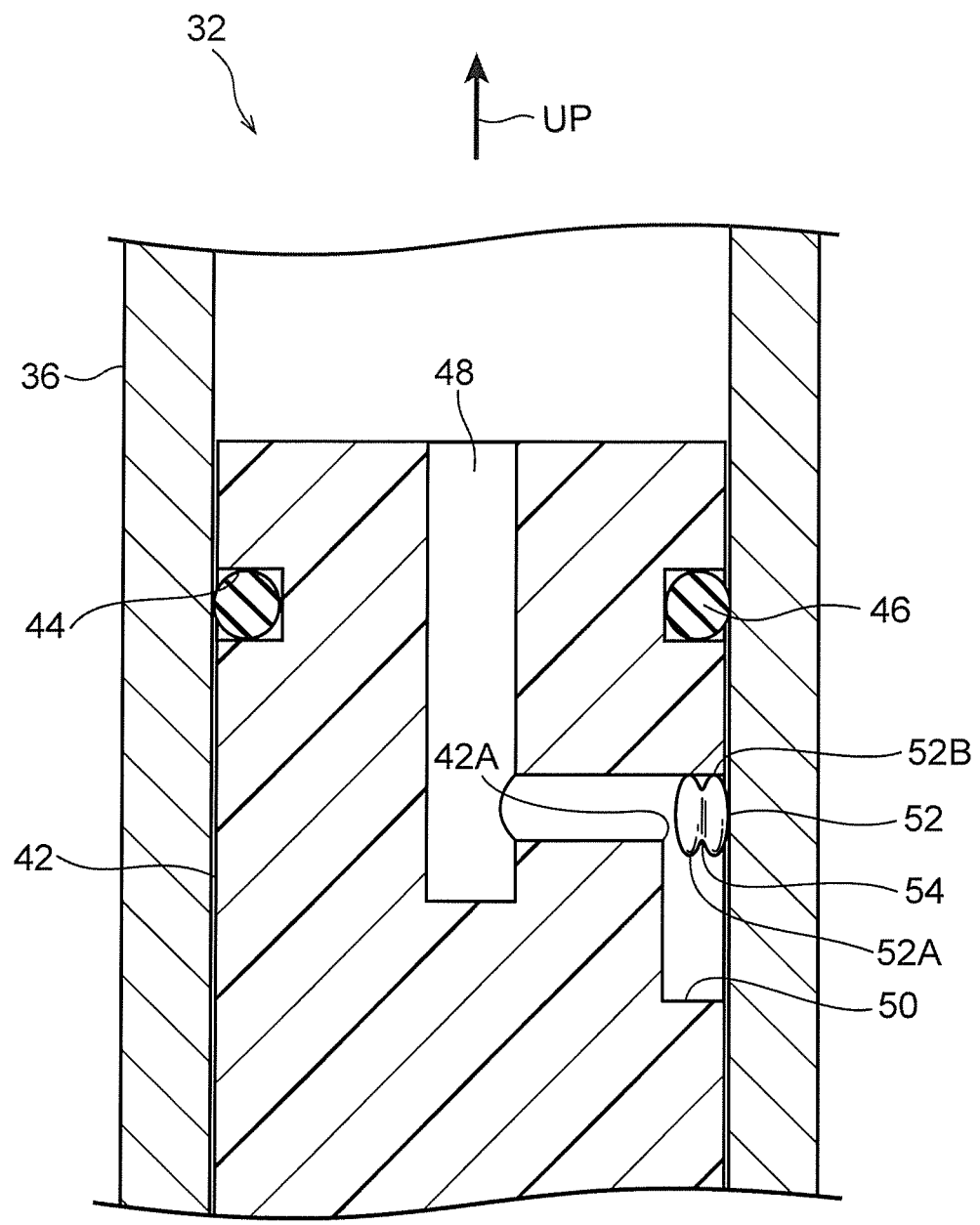
FIG. 12 is an enlarged sectional diagram showing an alternative mode during the operation of the pretensioner mechanism of the webbing take-up device in accordance with the exemplary embodiment of the present invention.

As illustrated in FIG. 12, when the pretensioner mechanism 32 is operated, in a case in which "a large rotating force from the occupant in the pull-out direction acts on the spool 16 and the pinion 26 via the webbing 18, before the piston 42 is moved to the lower side by the pressure of the gas in the cylinder 36 at the upper side of the piston 42 (of the O-ring 46), due thereto, a large movement force toward the upper side acts on the piston 42, thereby the piston 42 cannot move to the lower side", the pressure of the gas increases and the sealing member 52 is compressed in the longitudinal direction thereof against the inner periphery face of the cylinder 36 by the pressure of the gas.

Consequently, the sealing of the lower side portion of the communicating hole 48 by the base end portion 52A of the sealing member 52 is released, and the gas is allowed to flow from the upper side to the lower side of the piston 42 (of the O-ring 46) via the communicating hole 48 and the gap between the piston 42 and the cylinder 36. Thus, the increase in the pressure of the gas can be suppressed. Moreover, because the gas at high temperature passes, via the communicating hole 48, the sealing member 52, and the sealing member 52 is fused by such gas, the release of "the sealing of the lower side portion of the communicating hole 48 by the base end portion 52A of the sealing member 52" can be maintained, and the increase in the pressure of the gas can be suppressed effectively.

In the pretensioner mechanism 32, when the force limiter mechanism 20 is operated and rotating of the spool 16 in the pull-out direction is allowed as described above, the piston 42 is moved to the upper side in the state in which the distal end portion 52B of the sealing member 52 is pressed against and contacted the inner periphery face of the cylinder 36, thus, the sealing of the lower side portion of the communicating hole 48 by the base end portion 52A of the sealing member 52 is released. Therefore, the retainer such as disclosed in JP-A No. 2003-252172 is unnecessary in the embodiment, a number of components can be reduced, the pretensioner mechanism 32 can be assembled more easily, and costs can be reduced.

Furthermore, even in a case in which, when the pretensioner mechanism 32 is being assembled, the piston 42 and the sealing member 52 are inserted into the cylinder 36 in a state in which the sealing member 52 is completely inserted into the lower side portion of the communicating hole 48 of the piston 42, in this case, when the pretensioner mechanism 32 is operated, the distal end portion 52B of the sealing member 52 is pressed against and contacted the inner periphery face of the cylinder 36 by the pressure of the gas from the gas generator 38. Hence, when the force limiter mechanism 20 is operated, the base end portion 52A is turned relative to the distal end portion 52B by the frictional force between the sealing member 52 and the inner periphery face of the cylinder 36, and the sealing of the lower side portion of the communicating hole 48 by the base end portion 52A of the sealing member 52 is released.

Therefore, unlike JP-A No. 2003-252172 in which the retainer is provided, when the pretensioner mechanism 32 is being assembled, the piston 42 and sealing member 52 can be inserted into the cylinder 36 in a state in which the sealing member 52 is completely inserted into the lower side portion of the communicating hole 48 of the piston 42 and frictional force between the sealing member 52 and the inner periphery face of the cylinder 36 is reduced or eliminated. Therefore, the piston 42 and sealing member 52 can be inserted into the cylinder 36 easily, the pretensioner mechanism 32 can be assembled even more easily, and costs can be reduced even further.

Moreover, because the retainer such as disclosed in JP-A No. 2003-252172 can be unnecessary in the embodiment, a diameter dimension of the piston 42 at the lower side of the O-ring 46 (the side at which the pinion 26 is disposed) can be increased. Consequently, when the pretensioner mechanism 32 is operated, an amount of biting of the pinion 26 (the pinion teeth 26A) into the piston 42 (an amount of engagement between the piston 42 and the pinion 26) can be increased. Thus, the pinion 26 and the spool 16 can be rotated effectively in the take-up direction by the movement of the piston 42 to the lower side, and a restraining force on the occupant from the webbing 18 can be increased effectively.

In the present embodiment, the recess portion 54 is provided at the periphery face of the sealing member 52. However, the sealing member 52 may be formed in a rod shape (for example a cylindrical shape) without the recess portion 54 being provided at the periphery face of the sealing member 52. In this case, a chamfer portion may be formed at the corner portion 42A of the piston 42 between the periphery face of the lower side portion of the communicating hole 48 and the periphery face of the accommodating cavity 50. Due thereto, when the force limiter mechanism 20 is operated and the base end portion 52A of the sealing member 52 is turned relative to the distal end portion 52B, the sealing member 52 can be turned easily over the chamfered portion of the corner portion 42A, and the sealing of the lower side portion of the communicating hole 48 by the base end portion 52A of the sealing member 52 can be released with ease.

In the present embodiment, the material of the piston 42 is a soft resin. However, a material of the whole or a portion of the piston 42 may be a metal.

Figure 13:
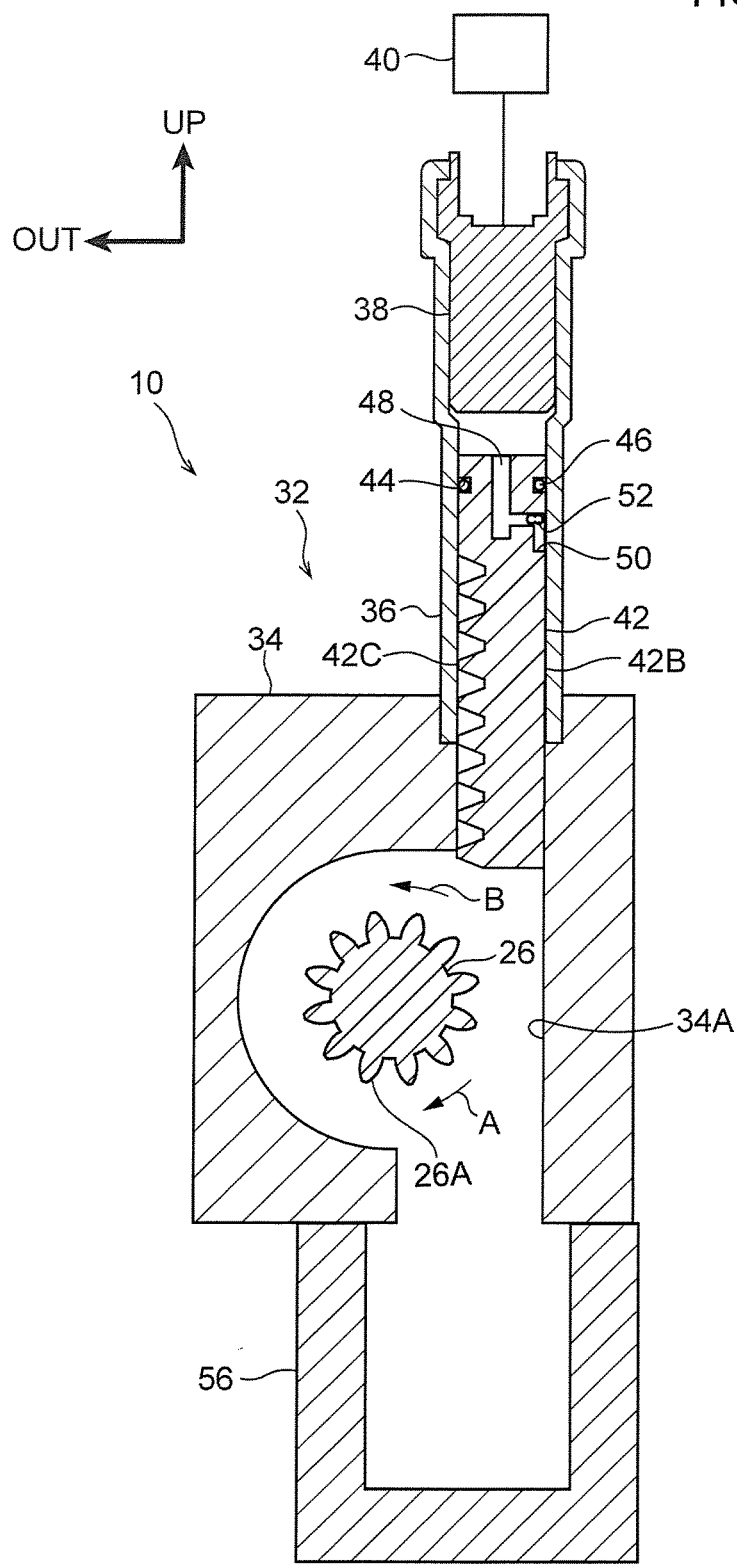
FIG. 13 is a sectional diagram (a section cut along line 3-3 of FIG. 1), viewed from the one side direction, showing a webbing take-up device in accordance with a first modified example of the exemplary embodiment of the present invention.

For example, in a first modified example illustrated in FIG. 13, the whole of the piston 42 is fabricated of metal. The fixing slot (groove) 44, the communicating hole 48 and the accommodating cavity (hole) 50 are formed at an upper portion of the piston 42. A portion of the piston 42 at the lower side relative to the upper portion is formed as a rack portion 42B. Rack teeth 42C are plurally formed at the rack portion 42B along the axial direction of the piston 42. The rack teeth 42C have, for example, isosceles triangle shapes in cross section. The pinion teeth 26A of the pinion 26 have shapes that correspond with the rack teeth 42C of the piston 42 (for example, isosceles triangle shapes in cross section), and the rack teeth 42C of the piston 42 can be meshed (engaged) with the pinion teeth 26A of the pinion 26.

Figure 14:
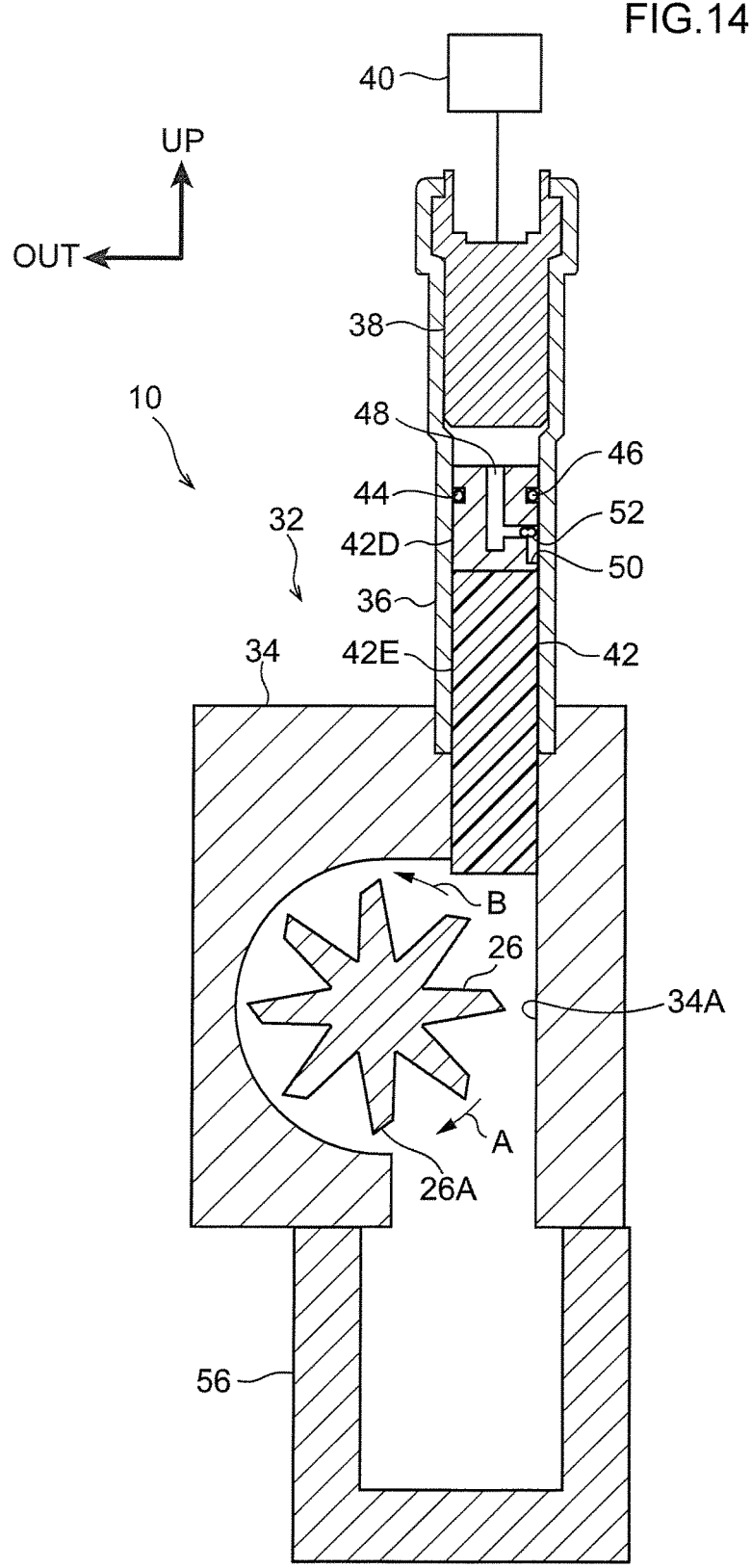
FIG. 14 is a sectional diagram (a section cut along line 3-3 of FIG. 1), viewed from the one side direction, showing a webbing take-up device in accordance with a second modified example of the exemplary embodiment of the present invention.

As a further example, in a second modified example illustrated in FIG. 14, the upper portion of the piston 42 is a metal portion 42D. The metal portion 42D is fabricated of metal, and the fixing slot (groove) 44, the communicating hole 48 and the accommodating cavity (hole) 50 are formed therein. A portion of the piston 42 at the lower side relative to the metal portion 42D is a soft portion 42E. Similarly to the embodiment described above, the soft portion 42E is fabricated of a soft resin in a circular rod shape. The pinion teeth 26A of the pinion 26 can easily bite into (to be particular, pierce) the soft portion 42E, and the piston 42 can be deformed to curve in a direction perpendicular to the axis thereof.

What is claimed is:

1. A webbing take-up device comprising:
a webbing that can be applied to an occupant of a vehicle;
a take-up member onto which the webbing is taken up, by the take-up member being rotated in a take-up direction, the take-up member being rotated in a pull-out direction by the webbing being pulled out;
a moving member in which a communicating hole is provided, the communicating hole communicating between one side and another side of the moving member, and the take-up member being rotated in the take-up direction by the moving member moving toward the one side;
a restricting member that is provided at the communicating hole and restricts communication through the communicating hole;
an accommodating member in which the moving member is accommodated, the moving member being moved to the one side by gas being supplied to the accommodating member at another side of the moving member; and
a force limiter mechanism that allows rotating of the take-up member in the pull-out direction when a load from the occupant that is at least a predetermined load or more acts on the take-up member via the webbing, wherein, when the force limiter mechanism allows rotating of the take-up member in the pull-out direction, the moving member moves to the another side due to rotating of the take-up member in the pull-out direction in a state in which the restricting member is in contact with the accommodating member, and the restricting member allows communication through the communicating hole, and wherein, by the moving member being moved to the another side in the state in which the restricting member is in contact with the accommodating member, the restricting member is caused to be turned and allows communication through the communicating hole.

2. The webbing take-up device of claim 1, wherein the restricting member is compressed between the accommodating member and the moving member by pressure of the gas at the another side of the moving member, whereby allowance of communication through the communicating hole is enabled.

3. The webbing take-up device of claim 1, wherein the moving member includes a recess, and the restricting member is caused to be turned from the communicating hole into the recess of the moving member to allow communication through the communicating hole.

4. The webbing take-up device of claim 1, wherein friction forces directly between the restricting member and the accommodation member cause the restricting member to turn.

5. A webbing take-up device comprising:
a webbing that can be applied to an occupant of a vehicle;
a take-up member onto which the webbing is taken up, by the take-up member being rotated in a take-up direction, the take-up member being rotated in a pull-out direction by the webbing being pulled out;
a moving member in which a communicating hole is provided, the communicating hole communicating between one side and another side of the moving member, and the take-up member being rotated in the take-up direction by the moving member moving toward the one side;
a restricting member that is provided at the communicating hole and restricts communication through the communicating hole;
an accommodating member in which the moving member is accommodated, the moving member being moved to the one side by gas being supplied to the accommodating member at another side of the moving member; and
a force limiter mechanism that allows rotating of the take-up member in the pull-out direction when a load from the occupant that is at least a predetermined load or more acts on the take-up member via the webbing, wherein, when the force limiter mechanism allows rotating of the take-up member in the pull-out direction, the moving member moves to the another side due to rotating of the take-up member in the pull-out direction in a state in which the restricting member is in contact with the accommodating member, and the restricting member allows communication through the communicating hole, wherein: the communicating hole is opened at: a supply-side of the moving member, at which the gas is supplied, and a facing side of the moving member, at which the moving member faces an inner face of the accommodating member in a state in which the moving member is accommodated in the accommodating member; and the restricting member is able to be in contact with the inner face of the accommodating member at the facing-side, wherein an accommodating portion is formed at the moving member at the facing side, the accommodating portion communicating through the communicating hole and enabling to accommodate the restricting member, and wherein, by the moving member being moved to the another side in the state in which the restricting member is in contact with the inner face of the accommodating member, the restricting member is caused to be turned and relatively moved to the accommodating portion side, whereby allows communication through the communicating hole.

* * * * *